United States Patent Office 2,895,406
Patented July 21, 1959

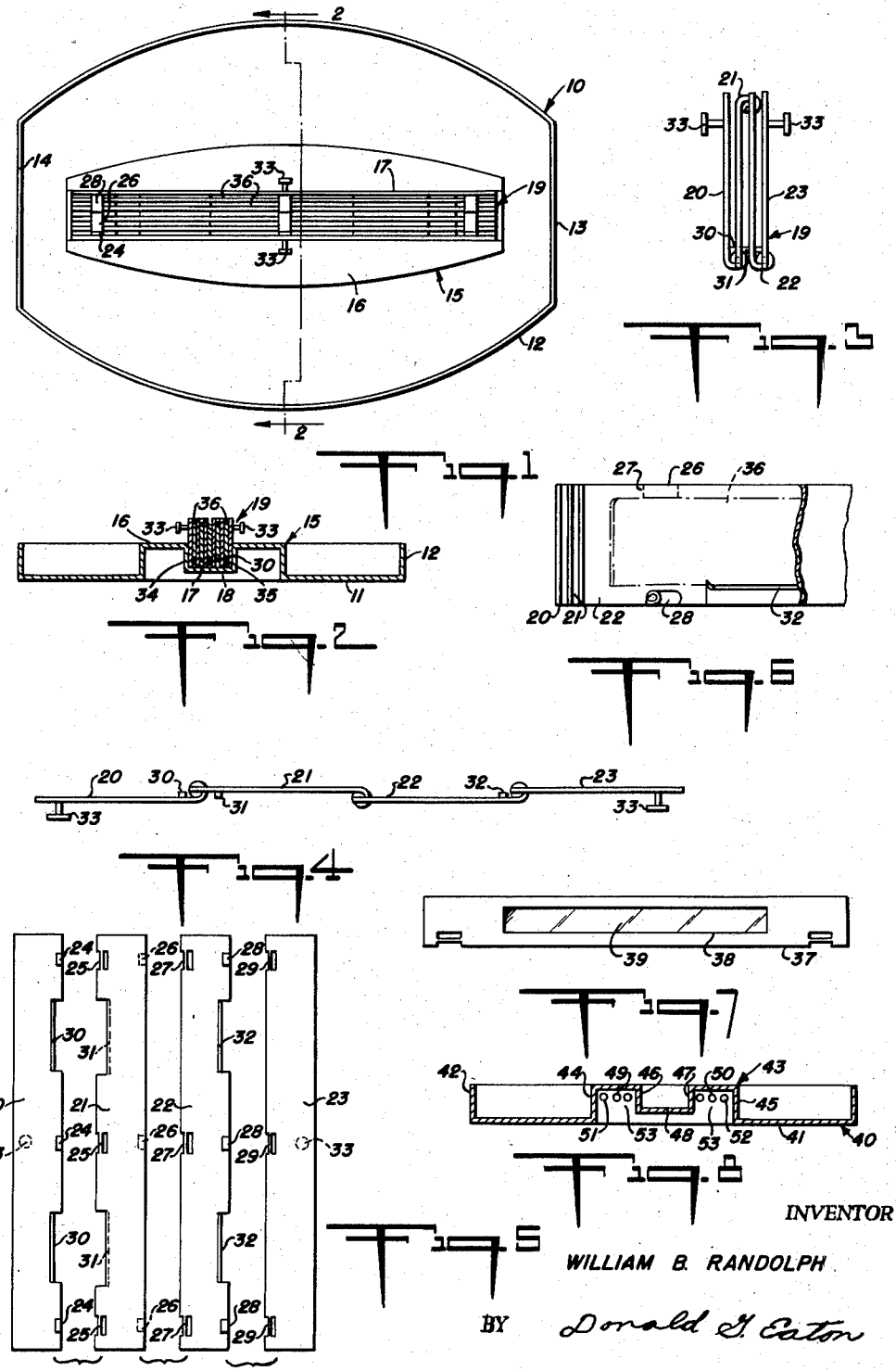

2,895,406

COOKING UTENSIL FOR STRIP FOOD PRODUCTS

William B. Randolph, Falls Church, Va.

Continuation of application Serial No. 553,070, December 14, 1955. This application March 18, 1957, Serial No. 646,677

17 Claims. (Cl. 99—341)

This invention relates to apparatus for use in treating and preparing food products and more particularly to a cooking utensil for strip food products, such as bacon or the like. This application is a continuation of my co-pending application, Serial No. 553,070 filed December 14, 1955.

As is well know, bacon and other similar strip food products are normally prepared for the table by placing the strips in a frying pan or other suitable cooking utensil which may be either of the electrically heated variety, or may be placed on a stove and the food product subjected to such heat for a suitable period of time. In order that the strips of bacon or other food product will be uniformly cooked on both sides, it is necessary to frequently turn the same and this requires frequent manual manipulation and since, there is a relatively large quantity of hot grease or other fluid in the pan, the act of turning the strips of bacon frequently splashes such grease onto surrounding objects and also frequently causes painful burns to the cook. Furthermore, it is well known that bacon and similar food products during cooking thereof, tends to twist and shrivel with the result that one strip frequently becomes attached to an adjacent strip thereby impeding or complicating the turning operation and furthermore, this twisting and shriveling results in uneven cooking of the food product.

It is accordingly an object of the invention to provide a cooking utensil for strip food products in which the strips of food are uniformally and simultaneously cooked on both sides without requiring any manipulation or turning of the same during the cooking operation.

A further object of the invention is the provision of a cooking utensil for strip food products in which any desired number of strips of food, such as bacon, may be placed in a holder and all of such strips simultaneously and uniformally cooked on both sides without attention during the cooking operation, the only manual operations necessary being the placing of the strips of food in the holder and removing the same therefrom after cooking.

A still further object of the invention is the provision of a cooking utensil for strip food products which may be manufactured in mass production by suitable stamping, drawing or casting operations and in which relatively lightweight materials, such as aluminum, may be employed.

Another object of the invention is the provision of a cooking utensil for strip food products in which such strips of food are supported in a manner to maintain the same out of contact with grease or other fluid flowing therefrom during the cooking operation and in which such grease or fluid is collected in a receptacle integral with the cooking utensil.

A further object of the invention is the provision of a cooking utensil for strip food products in which means is provided for simultaneously and uniformally cooking a plurality of strips of food, such as bacon, and in which means is further provided to permit visual inspection of such food strips during the cooking operation.

A still further object of the invention is the provision of a cooking utensil for strip food products and incorporating electrical heating means.

Another object of the invention is the provision of a cooking utensil for strip food products, including means comprising a holder for receiving a plurality of food strips in spaced substantially parallel edgewise position and for adequately supporting each strip from opposite sides thereof to prevent twisting or shriveling thereby resulting in a cooked food product, such as bacon or the like, which is substantially flat thereby presenting a pleasing appearance.

A further object of the invention is the provision of a cooking utensil for strip food products incorporating a holder for the food strip to maintain the same in upright edgewise position and with the heat for cooking being conducted through the holder.

Further objects and advantages of the invention will be apparent from the following description taken in conjunction with the accompanying drawing, wherein:

Fig. 1 is a top plan view of a cooking utensil constructed in accordance with this invention and showing a holder for strip food products in place therein, preparatory to the cooking operation;

Fig. 2 is a sectional view on the line 2—2 of Fig. 1;

Fig. 3 an enlarged end elevational view of the strip food holder in folded position, such as the same would occupy with strips of food placed therein and preparatory to placing the holder in the channel of the pan shown in Fig. 1;

Fig. 4 an end elevational view of the holder shown in Fig. 3 in flat or unfolded position;

Fig. 5 an exploded top plan view of the plates utilized to construct the strip food holder shown in Fig. 3 and showing the relationship of such plate prior to asembly;

Fig. 6 a fragmentary view in perspective with parts broken away for greater clairty and showing the position occupied by a strip of food during the cooking operation;

Fig. 7 a top plan view of a modified form of plate utilized in the strip food holder, the same being provided with an aperture closed by a transparent plate to permit inspection of the food product during the cooking operation; and Fig. 8 a transverse sectional view of a modified form of the cooking utensil of this invention and showing the inclusion of electrical heating means.

With continued reference to the drawing there is shown a cooking utensil constructed in accordance with this invention and which may well comprise a relatively shallow pan 10 provided with a bottom wall 11 and a sidewall 12. If desired, the pan 10 may be of oval shape, as shown in Fig. 1, with end walls 13 and 14, or if desired may be a true oval or may be formed with any other suitable configuration. The pan 10 may comprise a stamping or casting and the same may be made from suitable lightweight material, such as aluminum.

Located substantially centrally of the pan 10, is an elongated upstanding portion 15, which may be stamped from the bottom wall 11 of the pan 10, or formed integrally therewith during a casting operation depending upon the method used in the manufacture of the pan. Also, if desired, the upstanding portion 15 could be fabricated separately from the pan 10 and secured thereto in the proper location in any suitable manner. As will be noted from an inspection of Fig. 2, the upstanding portion 15 provides a top wall 16 spaced above the bottom wall 11 of the pan 10 and provided in the top wall 16 is a channel 17 extending longitudinally of the upstanding portion 15 and with the ends of the channel 17 open for a purpose to be presently described. It will be noted, that the upstanding portion 15 terminates at each end in spaced relation to the end walls 13 and 14 of the pan 10, or in the event a single sidewall 12 is provided, the ends of the upstanding portion 15 would terminate inwardly of such sidewall. It is also to be noted, that the bottom wall 18 of the channel 17 is spaced above the bottom wall 11 of the pan 10.

As shown in Fig. 2, the upstanding portion 15 is hollow, in order to conserve material, but of course, if desired, such upstanding portion 15 could be made solid, although this is not necessary to the operation of the cooking utensil of this invention.

With particular reference to Figs. 3 and 4, a holder 19 for receiving food strips is provided and such holder comprises a plurality of plates 20, 21, 22 and 23 hingedly connected together along alternate side edges in a manner and for a purpose to be presently described. For purposes of illustration only, four such plates have been shown, but it is to be understood, that any number of plates may be hingedly connected together to provide a holder for receiving any desired number of food strips.

As shown in Fig. 5, each of the plates 20, 21, 22 and 23 utilized to form the holder 19 is of elongated substantially rectangular flat configuration and each plate is at least as long and as wide as the length and width of the food strips to be received in the holder 19. The plates 20, 21, 22 and 23 may be stamped from suitable sheet material, such as aluminum and the plate 20 is provided along one edge, with a plurality of hinge elements 24 which extend through corresponding apertures 25 in the plate 21 and as clearly shown in Figs. 3 and 4, the hinge elements 24 are curled to hingedly connect the plate 20 to the plate 21 along one side edge thereof. The plate 21 is also provided with spaced hinge elements 26 which extend through apertures 27 in the plate 22 and hingedly connect plates 21 and 22 together along side edges thereof. Plate 22 is also provided with hinge elements 28 which extend through apertures 29 in the plate 23 and hingedly connect plates 22 and 23 together. Obviously, this same arrangement of hinge elements and apertures may be used to hingedly connect any desired number of plates together to provide a holder for receiving the desired number of food strips. The hinge elements on the plates 20, 21, 22 and 23 may be formed integral therewith by a suitable stamping operation, or if desired, such hinge elements may be separately fabricated and secured thereto in any suitable manner. Plate 20 is provided with a plurality of transversely extending lugs 30 which may be formed integral with the plate 20 by a suitable stamping operation or separately fabricated and secured thereto in any desired manner and it is to be noted, that the lugs 30 are located adjacent one edge of the plate 20, which edge is lowermost when the plates are in folded position as shown in Fig. 3. In a similar manner, plate 21 is provided with a plurality of lugs 31 and plate 22 is provided with a plurality of lugs 32. In each case, these lugs are adjacent the edge of the plate which will be lowermost when the same are in folded condition as shown in Fig. 3. In order to facilitate manipulation of the plates forming the holder 19, the outermost plates 20 and 23 may be provided with manipulating knobs or handles 33.

As shown in Fig. 4, the holder 19 may be unfolded to a substantially flat condition and a strip of bacon or other food product may be placed on the plate 20 with the edge of the strip engaging the lugs 30 and thereafter the plate 21 folded over to a position above the plate 20 and a strip of bacon or other food product may be placed on the plate 20 with the edge of the strip engaging the lugs 30 and thereafter the plate 21 folded over to a position above the plate 20 and a strip of bacon or other food product placed on the plate 20 with the edge thereof in engagement with the lugs 31. The plate 22 is then folded to overlie the plate 21 and a strip of bacon or other food product placed on the plate 22 with the edge in engagement with the lugs 32. The plate 23 is then folded to overlying position with relation to the plate 22 and the holder 19 is then in folded condition as shown in Fig. 3. Such holder with the strips of bacon or other food product contained therein is then placed in the channel 17, as shown in Figs. 1 and 2, with the outermost plates 20 and 23 engaging the sidewalls 34 and 35 of the channel 17 and with the lower edges of the holder 19 engaging the bottom wall 18 of the channel 17. Upon the application of heat to the under side of the pan 10, such heat will be conducted through the bottom wall 18 and sidewalls 34 and 35 of the channel 17 to the plates forming the holder 19 and as a result thereof, the strips of food product received between the plates will be uniformly cooked on both sides thereof and grease or other fluids flowing from the strips of food product will flow through the channel 17 and into the pan 10. As shown in Fig. 6, the strip of bacon or other food product 36 is firmly held between the plates of the holder 19 and with the lower edge of the strip 36 supported by the lugs 32. Of course, each strip 36 of food product between adjacent plates is positioned and supported in the same manner. Upon completion of the cooking operation, the holder 19 is removed from the channel 17 and opened to the position shown in Fig. 4, whereupon the strips of bacon or other food product may be conveniently removed therefrom.

If desired, the outer plates 20 and 23 of the holder 19 may be modified as shown in Fig. 7, in which a plate 37 is provided with an elongated aperture 38 and a plate of glass or other suitable heat-resistant transparent material 39 is attached to the plate 37 in any suitable manner to close the aperture 38, but at the same time, permit visual inspection of the outermost strips 36 of the food product during the cooking operation.

It is also to be understood, that the holder for food strips may comprise separate plates for receiving the food strips between them to provide a pack and that such pack may be supported in heat conducting relationship with the bottom wall of the pan in any desired manner, with the plates and food strips disposed at substantially right angles to the bottom wall of the pan. The heat for cooking the food strips is conducted through the plates.

It is furthermore obvious that if desired, the plates forming the holder for food strips may be supported in the pan by means other than a channel or groove.

A further modified form of the invention is shown in Fig. 8 in which a pan 40 is provided with a bottom wall 41 and a sidewall 42 and an upstanding portion 43 is formed in the bottom wall 41 in a manner similar to the upstanding portion 15 of the previously described form of the invention. The sidewalls 44 and 45, together with the sidewalls 46 and 47 on the channel 48 provide inverted channels 49 and 50 and received within the channels 49 and 50 are electrical heating elements 51 and 52 which may be retained in position by closure plates or sealing material 53. In this manner, a self-contained and self-heating cooking utensil is provided which eliminates the necessity of a stove or other heat producing medium.

It will be seen that by the above described invention there has been provided a relatively simple and economically constructed cooking utensil specifically designed for properly cooking strip food products, such as bacon or the like, to uniformally cook the same on both sides and to prevent wrinkling or shriveling of the bacon or other food product during the cooking operation. Furthermore, as will be obvious from the above, the bacon or other food product is maintained out of contact with the grease or other fluid flowing therefrom during the cooking operation which results in a dry crisp product, rather than one which has been soaked in grease, as is common in present day cooking operations for this particular type of food.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A cooking utensil for strip food products, said utensil comprising a relatively shallow pan having bottom and side walls, an elongated upstanding portion substantially centrally disposed in said bottom wall and terminating at opposite ends in spaced relation to said side wall and providing a top wall spaced above said bottom wall, a channel in said top wall extending longitudinally of said upstanding portion, said channel being open at opposite ends to permit drainage into said pan, a holder for strip food products removably disposed in said channel with strips of food carried thereby disposed in spaced substantially parallel, upright edgewise position, said holder comprising a plurality of elongated, substantially rectangular, flat plates, said plates being of a length and width at least equal to the length and width of said food strips, said plates being hingedly connected together at alternate top and bottom side edges whereby said plates may be folded into spaced substantially parallel relationship with a food strip disposed between each adjacent pair of plates and unfolded to facilitate the placing or removal of said food strips, laterally extending lugs on certain of said plates adjacent the lower side edges for engaging the lower edges of said food strips and supporting the same between adjacent pairs of plates and manipulating handles on the outermost plates of said holder whereby with food strips disposed between adjacent pairs of plates and with said holder disposed in said channel upon the application of heat to said upstanding portion said food strips will be uniformly cooked by heat conducted through said plates and fluid from said food strips will flow through said channel into said pan.

2. A cooking utensil for strip food products, said utensil comprising a relatively shallow pan having bottom and side walls, an elongated upstanding portion substantially centrally disposed in said bottom wall and terminating at opposite ends in spaced relation to said side walls and providing a top wall spaced above said bottom wall, a channel in said top wall extending longitudinally of said upstanding portion, said channel being open at opposite ends to permit drainage into said pan, a holder for strip food products removably disposed in said channel with strips of food carried thereby disposed in spaced, substantially parallel, upright edgewise position, said holder comprising a plurality of elongated, substantially rectangular, flat plates, said plates being hingedly connected together at alternate top and the bottom side edges whereby said plates may be folded into spaced substantially parallel relationship with a food strip disposed between each adjacent pair of plates and unfolded to facilitate the placing or removal of said food strips, laterally, extending lugs on certain of said plates adjacent the lower side edges for engaging the lower edges of said food strips and supporting the same between adjacent pairs of plates and manipulating handles on the outermost plates of said holder whereby with food strips disposed between adjacent pairs of plates and with said holder disposed in said channel upon the application of heat to said upstanding portion said food strips will be uniformally cooked by heat conducted through said plates and fluid from said food strips will flow through said channel into said pan.

3. A cooking utensil for strip food products, said utensil comprising a relatively shallow pan having bottom and side walls, an elongated upstanding portion substantially centrally disposed in said bottom wall and terminating at opposite ends in spaced relation to said side wall and providing a top wall spaced above said bottom wall, a channel in said top wall extending longitudinally of said upstanding portion, said channel being open at opposite ends to permit drainage into said pan, a holder for strip food products removably disposed in said channel with strips of food carried thereby disposed in spaced, substantially parallel, upright edgewise position, said holder comprising a plurality of elongated, substantially rectangular flat plates, said plates being hingedly connected together at alternate top and bottom side edges whereby said plates may be folded into spaced substantially parallel relationship with a food strip disposed between each adjacent pair of plates and unfolded to facilitate the placing or removal of said food strips and laterally extending lugs on certain of said plates adjacent the lower side edges for engaging the lower edges of said food strips and supporting the same between adjacent pairs of plates whereby with food strips disposed between adjacent pairs of plates and with said holder disposed in said channel upon the application of heat to said upstanding portion said food strips will be uniformly cooked by heat conducted through said plates and fluid from said food strips will flow through said channel into said pan.

4. A cooking utensil for strip food products, said utensil comprising a relatively shallow pan having bottom and side walls, an elongated upstanding portion substantially centrally disposed in said bottom wall and providing a top wall spaced above said bottom wall, a channel in said top wall extending longitudinally of said upstanding portion, said channel being open at opposite ends to permit drainage into said pan, a holder for strip food products removably disposed in said channel with strips of food carried thereby disposed in spaced, substantially parallel, upright edgewise position, said holder comprising a plurality of elongated, substantially rectangular, flat plates, said plates being hingedly connected together at alternate top and bottom side edges whereby said plates may be folded into spaced substantially parallel relationship with a food strip disposed between each adjacent pair of plates and unfolded to facilitate the placing or removal of said food strips and laterally extending lugs on certain of said plates adjacent the lower side edges for engaging the lower edges of said food strips and supporting the same between adjacent pairs of plates whereby with food strips disposed between adjacent pairs of plates and with said holder disposed in said channel upon the application of heat to said upstanding portion said food strips will be uniformly cooked by heat conducted through said plates and fluid from said food strips will flow through said channel into said pan.

5. A cooking utensil for strip food products, said utensil comprising a relatively shallow pan having bottom and side walls, an upstanding portion substantially centrally disposed in said bottom wall and providing a top wall spaced above said bottom wall, a channel in said top wall extending longitudinally of said upstanding portion, said channel being open at opposite ends to permit drainage into said pan, a holder for strip food products removably disposed in said channel with strips of food carried thereby disposed in spaced, substantially parallel, upright edgewise position, said holder comprising a plurality of elongated, substantially rectangular, flat plates, said plates being hingedly connected together at alternate top and bottom side edges whereby said plates may be folded into spaced substantially parallel relationship with a food strip disposed between each adjacent pair of plates and unfolded to facilitate the placing or removal of said food strips and means on certain of said plates for engaging said food strips and supporting the same between adjacent pairs of plates whereby with food strips disposed between adjacent pairs of plates and with said holder disposed in said channel upon the application of heat to said upstanding portion said food strips will be uniformly cooked by heat conducted through said plates and fluid from said food strips will flow through said channel into said pan.

6. A cooking utensil for strip food products, said utensil comprising a relatively shallow pan having bottom and side walls, an upstanding portion substantially centrally disposed in said bottom wall and providing a top wall spaced above said bottom wall, a channel in said top wall extending longitudinally of said upstanding portion, said channel being open at opposite ends to permit drainage into said pan, a holder for strip food products removably disposed in said channel with strips of food carried thereby disposed in spaced, substantially parallel, upright edgewise position, said holder comprising a plurality of elongated, substantially rectangular plates, said plates being hingedly connected together whereby said plates may be folded into spaced substantially parallel relationship with a food strip disposed between each adjacent pair of plates and unfolded to facilitate the placing or removal of said food strips and means on certain of said plates for engaging said food strips and supporting the same between adjacent pairs of plates and with said holder disposed in said channel upon the application of heat to said upstanding portion said food strips will be uniformly cooked by heat conducted through said plates and fluid from said food strips will flow through said channel into said pan.

7. A cooking utensil as defined in claim 4, in which said upstanding portion is hollow.

8. A cooking utensil as defined in claim 4, in which said upstanding portion is integral with the bottom wall of said pan.

9. A cooking utensil as defined in claim 4, in which said upstanding portion is hollow and integral with the bottom wall of said pan.

10. A cooking utensil as defined in claim 4, in which said upstanding portion is hollow and an electric heating element disposed in said upstanding portion.

11. A cooking utensil as defined in claim 4, in which said upstanding portion is hollow and integral with the bottom wall of said pan and an electric heating element disposed in said upstanding portion.

12. A cooking utensil as defined in claim 4, in which the outermost plates of said holder are provided with means for permitting inspection of the outermost food strips in said holder during cooking and while said holder is disposed in said channel.

13. A cooking utensil as defined in claim 4 in which the outermost plates of said holder are provided with elongated apertures and plates of heat-resistant transparent material closing said apertures whereby the outermost food strips in said holder may be inspected during cooking and while said holder is disposed in said channel.

14. A cooking utensil as defined in claim 4, in which the means for hingedly connecting said plates together is integral with the respective plates.

15. A cooking utensil as defined in claim 4, in which said lugs are integral with the respective plates.

16. A cooking utensil as defined in claim 4, in which the means for hingedly connecting said plates together and said lugs are integral with said plates.

17. A cooking utensil for strip food products, said utensil comprising a pan having imperforate bottom and side walls, a holder for strip food products comprising a plurality of spaced substantially parallel heat conducting plates for receiving a food strip between each adjacent pair of plates and means for removably supporting said holder on said bottom wall in direct contact with and in heat conducting relationship thereto with said plates and food strips disposed at substantially right angles to said bottom wall whereby said food strips will be uniformally cooked by heat conducted through said plates.

References Cited in the file of this patent

UNITED STATES PATENTS

| | | |
|---|---|---|
| 2,506,305 | Maldonado | May 2, 1950 |
| 2,652,766 | Cralle | Sept. 22, 1953 |